Nov. 12, 1968 R. M. HOCHREUTINER 3,410,968

COMMUNICATION SYSTEMS

Filed June 21, 1965 5 Sheets-Sheet 1

Inventor
RODGER MAURICE HOCHREUTINER

By [signature]
Attorney

Inventor
RODGER MAURICE HOCHREUTINER
By [signature]
Attorney

Nov. 12, 1968 R. M. HOCHREUTINER 3,410,968

COMMUNICATION SYSTEMS

Filed June 21, 1965 3 Sheets-Sheet 3

Inventor
RODGER MAURICE HOCHREUTINER

By [signature]
Attorney

United States Patent Office 3,410,968

Patented Nov. 12, 1968

3,410,968
COMMUNICATION SYSTEMS
Roger Maurice Hochreutiner, Harlow, Essex, England, assignor to International Standard Electric Corporation, New York, N.Y., a corporation of Delaware Filed June 21, 1965, Ser. No. 465,387
Claims priority, application Great Britain, June 26, 1964, 26,502/64
11 Claims. (Cl. 179—175.31)

ABSTRACT OF THE DISCLOSURE

Remote supervision is maintained for a telecommunication line incorporating a plurality of repeater stages. The repeater chain is arranged as a shift register which is stepped off-on by switching line feed current. Line current and signal paths are looped at each repeater in turn by successive pulses so that faulty cable sections and repeaters can be identified. The switching element at each repeater is a silicon controlled rectifier gated by a thermistor.

This invention relates to communication systems including means for the remote testing of a plurality of serially-connected channel sections, such as the sections between repeater stations.

According to the invention, the communication system includes a communication channel consisting of two or more serially connected sections and intermediate stations each associated with a said section and arranged to respond to a line test signal from a terminal station by transmitting an acknowledgement signal, the arrangement being such that successive identical signals from the terminal stations interrogate successive intermediate stations along the channel.

According to a feature of the invention each intermediate station responds to the reception of a line test signal from a terminal station by setting up a signal loop that prevents the transmission of the test signal to the following channel section and also by its presence provides an indication to a terminal station.

The invention is particularly applicable to channels in which separate circuits are employed, involving separate repeaters at each repeater station, for each direction of transmission. In such systems, according to another feature of the invention, the looping of the line current path by an intermediate station in response to a line test signal from a terminal station is also effective to vary the communication signal paths within the intermediate station so that signals received from a terminal station over one communication signal circuit are sent back to the same terminal station over the other communication signal circuit.

The foregoing and other features of the invention will be evident from the following description of a two-way communication system employing a plurality of repeater stations for each direction, and embodying the invention in a preferred form. The description refers to the accompanying drawings in which.

Figure 1:
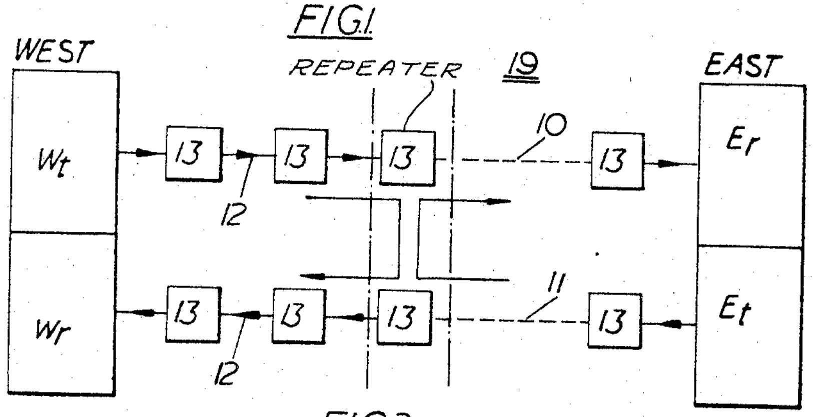
FIG. 1 is a schematic drawing of the system.

FIG. 1 of the drawings represents West and East terminal stations of a communication link, the transmitters $W_t$ and $E_t$ of the terminal stations being connected with the corresponding receivers $E_r$ and $W_r$ through one-way communication channels 10 and 11 respectively, comprising cable sections 12 connecting repeaters 13. The two channels have the same geographical path and corresponding repeaters 13 in the two channels 10 and 11 are associated in a single repeater station.

Figure 2:
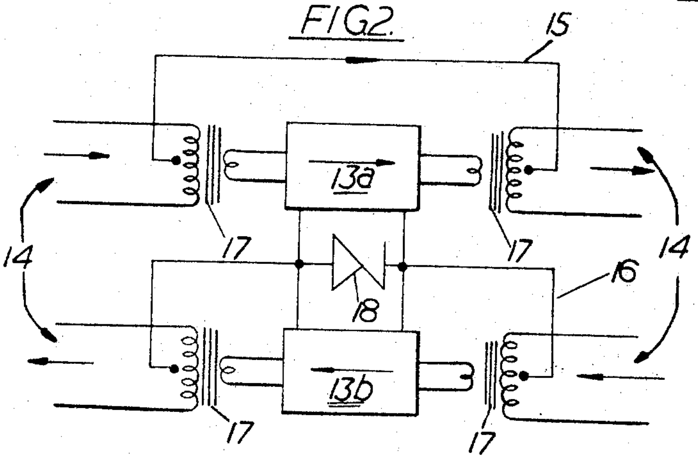
FIG. 2 shows the arrangement of the signal and line current paths associated with one pair of repeaters of the system.

Each cable section 12 between adjacent repeaters 13 in either of the two channels consists of a single-pair line 14 (FIG. 2) for the signal currents. The power supply for the repeaters 13 in the two channels is obtained by passing a line current through the phantom circuit formed by the two conductors of the cable pair in parallel, the phantom circuit being completed at the repeater stations by connections 15 and 16 strapping the centre taps of the line transformers 17. A reverse Zener diode 18 connected in series with one conductor 16 of the phantom circuit forms an impedance across which the power-consuming circuits of the two repeaters 13*a* and 13*b* located at the repeater station are connected.

The present invention is concerned with an arrangement by which the cable sections 12 and repeaters 13 of the two channels 10 and 11 connecting the West and East terminal stations can be individually tested from one of the terminal stations and caused to provide an indication of correct or faulty operation. This is effected by causing a "test" signal received at a given repeater station, for example station 19 in FIG. 1, to place a loop on the line-current path through the phantom circuits, thus providing a test of line continuity on both channels 10 and 11 between the West terminal station and repeater staion 19, and also to loop back the signal current paths (as indicated in FIG. 1) to the receivers of the appropriate transmitting stations. The signal pattern so received can then be compared with the transmitted pattern to determine the correct operation of the repeaters included in the loop.

Figure 3:
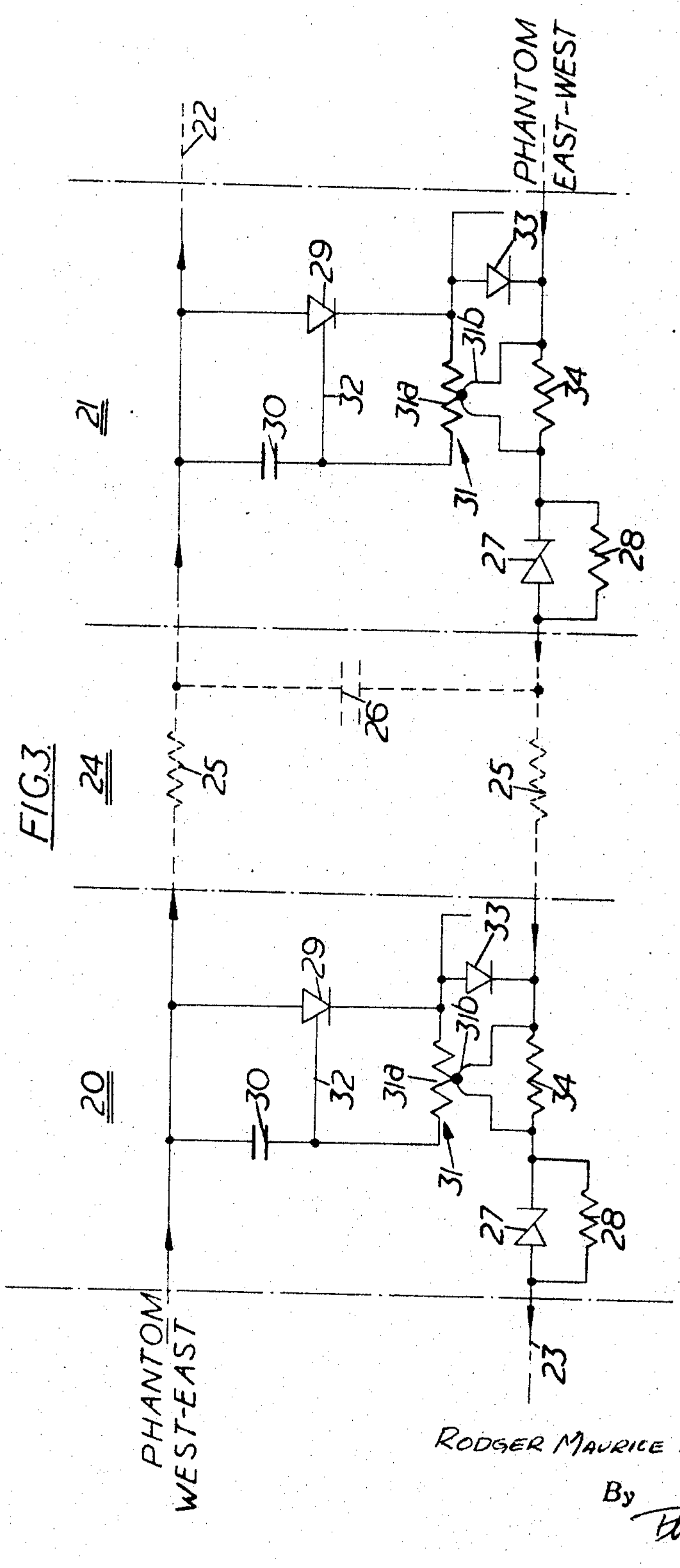
FIG. 3 is a circuit diagram of the control circuits associated with two successive pairs of repeaters.

The manner of carrying out tests as described in the preceding paragraph will first be explained with reference to the operation of looping back the line-current path provided by the phantom circuits, since these circuits are employed to control the testing operation. FIG. 3 of the drawings shows the parts of two successive repeater stations 20 and 21 associated with the West/East and East/West phantom circuits 22 and 23 respectively. The cable station 24 joining the two repeater stations is represented in FIG. 3 by the series resistance 25 represented by each phantom circuit of the cable and by the interphantom capacitance 26.

During normal operation of the system line current flows round the phantom circuit in the direction indicated, developing across the Zener diode 27 in each repeater station the driving voltage necessary for the power consuming circuits of the two repeaters at each station, represented by the loads 28. It will be assumed that the current source for the line current is located at the West terminal station. In order to initiate the testing of the system the line current is first interrupted and then rapidly restored, preferably by short-circuiting the phantom circuit terminals at the terminal station and then interrupting the short circuit. The resulting steep-fronted voltage waveform travels over the phantom circuit of the cable section and appears between the phantom conductors at repeater station 20, assumed to be the first station in the line. The two phantom conductors 22 and 23 in each repeater station are bridged by a silicon controlled rectifier or similar triggered two-state devices 29, normally quiescent so that its presence across the line does not affect the normal operation of the circuit. The sharply-rising test impulse is applied between anode and cathode of this rectifier and is also applied to the differentiating circuit formed by a trigger capacitor 30 and the resistance 31 of a thermistor element. The short voltage impulse so obtained is applied to the trigger electrode 32 of the controlled rectifier 29, causing the latter to conduct and establish a short circuit between the two phantom conductors 22 and 23. The function of the additional diode 33, which plays no part in this operation, will be explained with reference to FIG. 5.

Under these conditions, therefore, a line current flows through the loop formed by the Eastbond and Westbound phantom circuits in the cable section connecting the West terminal station to the repeater station 20, and if, as is usual, the line current is defined by a current regulator the voltage present at the phantom terminals of the West terminal station affords an indication of the state of this loop. The line current also flows through the heating element **31*b* of thermistor 31, causing the resistance value of the thermistor element 31*a* to fall sharply. (Shunt resistor 34** is provided to match the thermistor characteristic with the line operating conditions).

If now the line current is again interrupted and restored, the resulting voltage impulse arriving at the first repeater station 20 will again be applied across the controlled rectifier 29; this rectifier will, of course, have ceased to conduct with the removal of the applied voltage across it, and will not again conduct without the application of a trigger impulse to its trigger terminal 32. However, this terminal 32 is now clamped to the cathode potential of the controlled rectifier 29 by the thermistor element **31*a*, which has a relatively long time constant and will therefore remain in its low resistance condition during the brief interruption of the line current. The controlled rectifier 29 of the first repeater station 20 is thus prevented from firing, and the test voltage impulse passes over the next intervening cable section 24 to the next repeater station 21, where it fires the controlled rectifier 29 and establishes the loop across the phantom line-current circuit at this new point along the channel. It will be noted that the line current flowing in this new loop also flows through the thermistor heating element 31*b* of the first repeater 20, ensuring that the thermistor element 31*a*** of the first repeater remains in its low resistance condition. The phantom circuit line voltmeter at the West terminal station will now give a new voltage reading corresponding to the resistance of the new current loop.

It will be seen, therefore, that if the line current through the phantom circuit is successively interrupted and restored at one terminal station, the phantom circuits of the two channels are successively looped together at each repeater station, proving the continuity of the cables and phantom circuits forming the loop and giving an indication by voltage readings at the terminal station of the station at which looping back is occurring. This information does not give any direct information as to the operation of these parts of the line under signal conditions, and accordingly the successive switching of the control circuit shown in FIG. 3 in response to the successive test impulses from the terminal station is also employed to loop back the signal paths of the two channels in the manner now to be described.

Figure 4:
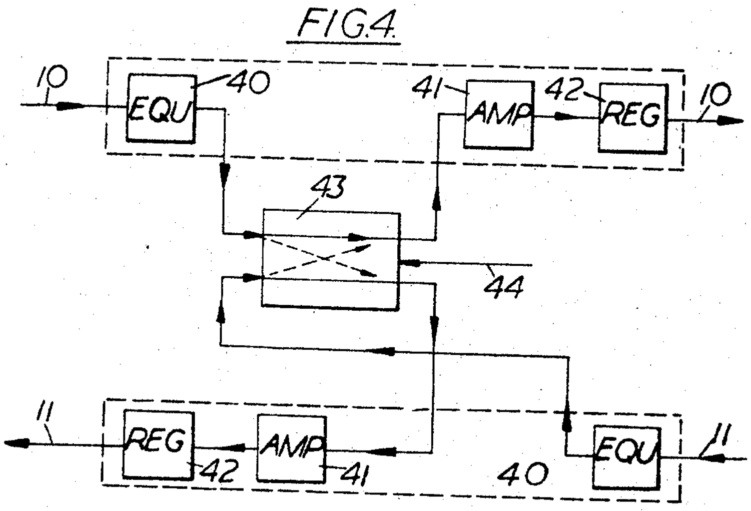
FIG. 4 is a blocked diagram showing the possible signal current paths associated with a single pair of repeaters.

FIG. 4 of the drawings shows a schematic block diagram of a single repeater station, showing how the signal current paths are looped back in correspondence with the operation of the control circuits. The two repeaters inserted in the West/East and East/West signal paths 10 and 11 respectively each comprise an equalizing preamplifier 40, an amplifier 41 and a pulse regenerator 42, these three units being connected serially in the signal path. A path selection gate 43 is included in the two signal paths between the pre-amplifier and main amplifier of each repeater. This gate 43 has the normal condition indicated by the full lines, in which it completes the signal paths through each repeated, but is capable of being set by a control signal 44 to the condition shown by the broken lines in which the output of the pre-amplifier of the East-going repeater is fed into the main amplifier of the West-going repeater, a similar exchange of functions being carried out for signals arriving over the West-going line. Thus signals arriving at the repeater station from the West terminal station are fed back to the receiver of the West station, and a test pattern transmitted during looping can be compared with the equivalent received signal to provide an indication of the functioning of the repeaters included in the signal loop. Since by this system a new repeater station is included in the signal loop for each switching step, it becomes a simple matter to identify a repeater station at which the signal is interrupted or distorted.

Figure 5:
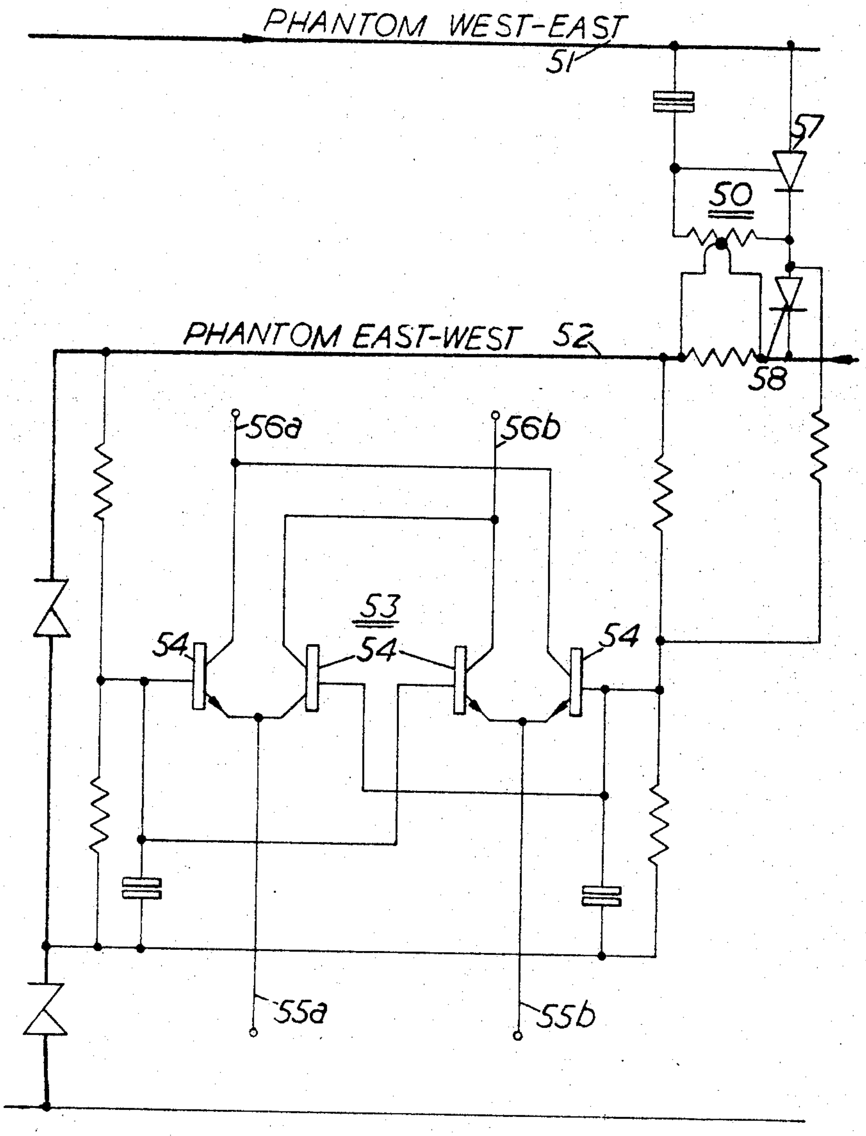
FIG. 5 is a circuit diagram showing the control circuit corresponding to FIG. 4.

FIG. 5 of the drawings shows the interaction in a repeater station between the line current responsive control circuit such as those shown in FIG. 3 and the signal current gating circuits shown in FIG. 4. In FIG. 5 the line current circuit 50 connected between the two phantom conductors 51 and 52 is exactly equivalent to one of the control circuits shown in FIG. 3. The gating circuit 53, corresponding to the gate 43 shown in FIG. 4, comprises four transistors 54 arranged in pairs so that each of the two signal input terminals **55*a* and 55*b* can be connected at will to either of the two output terminals 56*a* and 56*b*. During normal operation each input is connected through the left hand transistor of each pair to the corresponding output terminal, corresponding to the normal gate condition shown by full line connections for the gate 43 in FIG. 4. When the control circuit 50 switches in response to a voltage impulse between the two phantom conductors, the line current loop is completed through the triggered rectifier 57 and the diode 58; the voltage developed across diode 58 is used to switch over the pairs of transistors 54 so that for example input 55*a* is connected to output 56*b*, this condition corresponding to the broken line condition shown in FIG. 4. This condition persists so long as the line current loop is completed through this repeater station. When the line current is interrupted the gate circuit re-sets to its normal condition. When looping back occurs at repeater stations further down the line, diode 58 is reversed biased and the gating transistors 54** remain in their normal condition.

Returning now to FIG. 3, it has been explained that the control circuits at each repeater station are responsive to a sharply rising voltage wave between the phantom conductors of the line; the presence of the trigger capacitor 30 in the control circuit prevents the circuit from responding to a voltage impulse with a slow rate of rise. If, however, this capacitor is replaced by a resistor, a slowly rising wavefront will trigger the control circuit and set up a line current loop as already explained. This property may be utilized to effect the selective switching of the individual repeater stations in the line; in particular the last stations in the line may be provided with resistors instead of the capacitor 30, in order to ensure that when desired the line may be brought into service by a single switching operation without the necessity for going through the full test procedure. The necessary slowly rising wavefront may be obtained by a capacitor of high value connected in parallel with the line current source. This also ensures that after momentary interruptions due to power supply failure normal operation of the line is automatically restored. In such an arrangement use already mentioned of a short circuiting switch to control the transmission of the test signal impulses over the line provided a clear distinction between test pulses and the slowly rising pulses occurring on normal switch-on, and also avoids the use of additional contacts connected in series with the line current path.

It is to be understood that the foregoing description of specific examples of this invention is made by way of example only and is not to be considered as a limitation on its scope.

What I claim is:

1. A communication system including a communication channel consisting of two or more serially connected sections, a plurality of intermediate stations each associated with one of said sections, each station including solid state triggering means arranged to respond to a line test signal from a terminal station by transmitting an acknowledgment signal, the arrangement including means by which successive interrupted and restored identical signals from the terminal stations interrogate successive intermediate stations along the channel.

2. A system according to claim 1, wherein each intermediate station responds to the reception of a line test signal from a terminal station by setting up a signal loop that prevents the transmission of the test signal to the following channel selection and also by its presence provides an indication to a terminal station.

3. A system according to claim 2 wherein each said intermediate station maintains the said signal loop only so long as the line test signal initiating it persists.

4. A system according to claim 3 wherein each intermediate station is arranged to respond only to the first of a series of line test signals applied thereto.

5. A system according to claim 4 wherein the solid state triggering means includes a triggered two-state device arranged to set up the said signal loop in response to a trigger signal derived from the line test signal and applied to a trigger terminal of the two-state device, which subsequently maintains the signal loop while the line test signal persists irrespective of the state of the signal at its trigger terminal.

6. A system according to claim 5 wherein each intermediate station includes means responsive to the setting up of a said signal loop at the said intermediate station or at any subsequent point in the channel, and arranged to prevent all after the first of a series of line test signals from producing a trigger signal at the trigger terminal of the said two-state device.

7. A system according to claim 1 wherein a terminal station includes a line current source which in normal service maintains a direct current in a current path of the channel, the initiation of current flow in the said current path constituting a line test signal, whereby the repeated interruption and re-establishment of the line current is caused to interrogate successive intermediate stations along the channel.

8. A system according to claim 7 wherein the said repeated interruption and re-establishment of the line current is effected by switching means arranged to short circuit the line current terminals of the terminal station.

9. A system according to claim 7 wherein the channel includes communication signal circuits for each direction of transmission and each intermediate station includes two repeater amplifiers, one for each circuit, which derive their power supply from the line current circulated by the terminal station line current source through the phantom circuits of the two communication circuits.

10. A system according to claim 9 wherein the looping of the line current path by an intermediate station in response to a line test signal from a terminal station is also effective to vary the communication signal paths within the intermediate station so that signals received from a terminal station over one communication signal circuit are sent back to the same terminal station over the other communication signal circuit.

11. A repeater apparatus, for a communication system as claimed in claim 1, including two repeater amplifiers, one for each of two directions of transmission, arranged to derive input power from line current circulating in phantom circuits of the two corresponding transmission circuits, the solid state triggering means including a two-state device connected across the line current path and triggered into conduction by a voltage pulse applied to a trigger terminal thereof and derived from the initiation of line current at a terminal station of the system, a current sensitive device connected in series with the line current path on the terminal station side of the two-state device and arranged while line current flows through it to prevent the application of a further trigger pulse to the trigger terminal of the two-state device, the current sensitive device having a long time constant so that it continues to prevent triggering of the two-state device in spite of momentary interruptions of the line current, and signal gating means operating in correspondence with the conduction of the two-state device to cause signals arriving at the repeater apparatus from a terminal station to be transmitted back to the same terminal station.

References Cited

UNITED STATES PATENTS 3,054,865 9/1962 Holloway -------- 179—175.31

FOREIGN PATENTS 6,944,002 12/1963 England.

KATHLEEN H. CLAFFY, *Primary Examiner.*

A. MCGILL, *Assistant Examiner.*